(12) United States Patent
Takagi et al.

(10) Patent No.: US 7,108,632 B2
(45) Date of Patent: Sep. 19, 2006

(54) CONTROL APPARATUS OF AUTOMATIC TRANSMISSION

(75) Inventors: Kiyoharu Takagi, Okazaki (JP); Akira Aikawa, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 341 days.

(21) Appl. No.: 10/808,294

(22) Filed: Mar. 25, 2004

(65) Prior Publication Data

US 2006/0148614 A1   Jul. 6, 2006

(30) Foreign Application Priority Data

Mar. 25, 2003   (JP)   ............................. 2003-081939

(51) Int. Cl.
*B60W 10/02*   (2006.01)
*B60W 10/04*   (2006.01)
*B60W 10/10*   (2006.01)

(52) U.S. Cl. .................. 477/70; 477/156; 475/127; 701/59

(58) Field of Classification Search .................. 477/53, 477/70, 121, 156; 475/120, 127; 701/59, 701/67

See application file for complete search history.

(56) References Cited

U.S. PATENT DOCUMENTS

| 5,785,628 | A  | * | 7/1998 | Kamada et al. | ............. 477/130 |
| 5,925,086 | A  | * | 7/1999 | Sakai et al.   | ................... 701/66 |
| 6,334,833 | B1 | * | 1/2002 | Ochi et al.    | ................... 477/143 |
| 6,520,882 | B1 | * | 2/2003 | Saito          | .......................... 475/127 |
| 6,872,166 | B1 | * | 3/2005 | Takagi et al.  | ............... 477/117 |
| 7,001,299 | B1 | * | 2/2006 | Takagi et al.  | ............... 475/116 |

FOREIGN PATENT DOCUMENTS

| JP | 8-303568   | 11/1996 |
| JP | 8-338519   | 12/1996 |
| JP | 2002-295529 | 10/2002 |

* cited by examiner

*Primary Examiner*—Tisha Lewis
(74) *Attorney, Agent, or Firm*—Buchanan Ingersoll & Rooney PC (57) ABSTRACT

An automatic transmission including plural friction engaging elements configures plural shift ranges based on combinations of each friction engaging element being in engaging or disengaging condition and a controlling unit for controlling the friction engaging elements to be in engaging or disengaging condition by controlling a hydraulic pressure applied.

4 Claims, 5 Drawing Sheets

|  |  | C1 | C2 | C3 | B1 | B2 |
|---|---|---|---|---|---|---|
| R range | R |  |  | O |  | O |
| N range | N |  |  |  |  | O |
| D range | N |  |  |  | (O) | O |
|  | First speed | O |  |  |  | O |
|  | Second speed | O |  |  | O |  |
|  | Third speed | O |  | O |  |  |
|  | Forth speed | O | O |  |  |  |
|  | Fifth speed |  | O | O |  |  |
|  | Sixth speed |  |  |  | O |  |

O:Engaging.  Empty:Disengaging

CONTROL APPARATUS OF AUTOMATIC TRANSMISSION

This application is based on and claims priority under 35 U.S.C. § 119 with respect to Japanese Application No. 2003-081939 filed on Mar. 25, 2003, the entire content of which is incorporated herein by reference.

FIELD OF THE INVENTION

This invention generally relates to an automatic transmission and a stand-by hydraulic pressure value setting means for the automatic transmission.

BACKGROUND OF THE INVENTION

A known hydraulic pressure value controller for an automatic transmission directly controls a hydraulic pressure value from a hydraulic pressure source by an electromagnetic valve and the hydraulic pressure value provided to friction engaging elements (friction clutch and friction brake), then each friction engaging element becomes engaged or disengaged. In Japanese Patent Laid-Open Publication No. 2002-295529, a clutch torque point leaning method for preferably controlling the electromagnetic valve to be opened and closed has been disclosed. Specifically, according to such clutch torque point learning method, a duty ratio of a duty pulse is learned by a electronic control unit (hereinbelow referred to as ECU) as a torque transmitting start point (torque point) for controlling the clutch to be moved rapidly within an allowance range from the point where the clutch starts to be moved to the point where the clutch becomes in engaging condition, and for further controlling the clutch to be moved slowly by shifting the connection speed once the clutch becomes in engaging condition.

Figure 8:
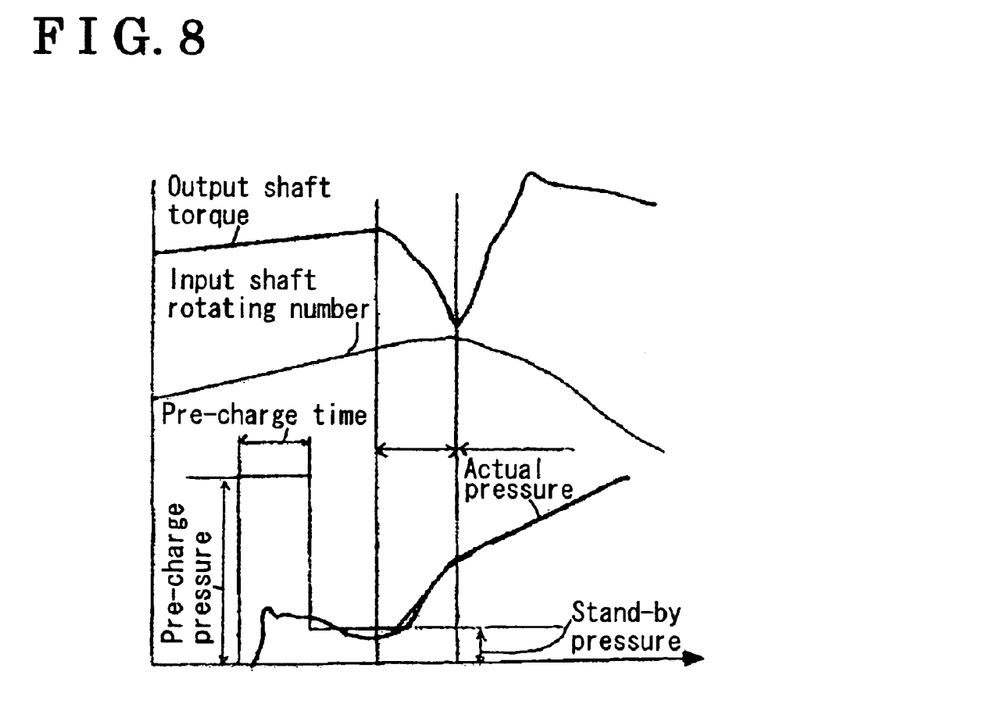
FIG. 8 illustrates a graph indicating a wave form of the hydraulic pressure when the automatic transmission is shifted up.

As shown in FIG. 8, in the allowance range of a first half of a piston stroke of a clutch piston (hereinbelow referred to as a piston), the friction engaging element is quickly filled with fluid (pre-charge) for increasing a piston speed. After a predetermined time of the pre-charge, the piston speed is decelerated to almost "zero" on the verge of that the friction engaging element becomes in engaging condition. Then, the piston speed needs to be maintained at a low speed corresponding to the low hydraulic pressure value (stand-by hydraulic pressure value) being equivalent to a force of a return spring as a reaction force element of the friction engaging element for keeping the piston at stand-by position. In this way, the automatic transmission needs to be more improved in terms of responsiveness and followability. Thus, the operation speed of transmission may be improved, at the same time, a shift shock may be prevented.

Although, an actual pressure may differ from an instruction pressure due to a difference of the reaction force between each return spring on each product. In addition, such phenomena result from an influence from each element excepting a control valve's performance, for example, an influence of the output flow amount from an oil pump when a stroke of the piston is controlled by the hydraulic amount control, not by the hydraulic pressure control. Thus, a means for precisely detecting and setting the return spring equivalent pressure (stand-by hydraulic pressure value) needs to be presented. Specifically, if the return spring equivalent pressure can be set to a proper value, especially at a factory initial setup, for preferably maintaining the piston at the stand-by position thereof, manufacturing variations of the automatic transmission, an engine and the electromagnetic valve on each product which may cause an individual difference between each product can be absorbed. Thus, the quality of the automatic transmission will be secured.

A known means for setting the return spring equivalent pressure (stand-by hydraulic pressure) in consideration of absorbing the individual difference between each product is disclosed in Japanese Patent Laid-Open Publication No. 8-338519. In this reference, an engagement controlling device of the friction element is disclosed, which is actuated by hydraulic pressure for monitoring an input shaft, detecting a rotating number change, and adjusting the pressure at critical value before engaging force is generated. In addition, a known controlling device of the automatic transmission is also disclosed in Japanese Patent Laid-Open Publication No. 8-303568, which can adjust an initial engaging pressure (stand-by hydraulic pressure) at a preferable value based on an engagement starting pressure being required when the clutch starts engaging movement corresponding to a preferable neutral control.

The controlling device in Japanese Patent Laid-Open Publication No. 8-338519, however, may misjudge the rotation number difference of the input shaft due to fluctuation on engine rotating number or noise, in addition, a problem may be occurred that the rotating number of the input shaft may not be changed if an inappropriate pre-charge control has been done. Thus, the known means for setting the return spring equivalent pressure (stand-by hydraulic pressure) in consideration of absorbing the individual difference between each product as disclosed in Japanese Patent Laid-Open Publication No. 8-338519 is not applicable for initial setting even if it is applicable for a long-term learning.

In such controlling device of the automatic transmission being adjustable for the initial engaging pressure (stand-by hydraulic pressure) at the preferable value as disclosed in Japanese Patent Laid-Open Publication No. 8-303568, a threshold for detecting the engaging starting pressure on each automatic transmission needs to be changed in consideration of the manufacturing variation on each automatic transmission, in addition, an influence from temperature change (oil temperature change) needs to be considered. In addition, such controlling device is based on the preferable neutral control, so that such controlling device is applicable for detecting the stand-by hydraulic pressure of the friction engaging element requiring a small input torque such as a C1 clutch for changing from N to D and having the rotation change equal to or less than the rotation change of the input shaft, however, such controlling device is not applicable for detecting the stand-by hydraulic pressure of another friction engaging element because the detecting accuracy may be decreased due to significant rotation change.

In consideration of aforementioned problems, the present invention seeks to provide a stand-by hydraulic pressure value setting means being high accuracy and applicable regardless of various conditions, such as individual difference between each product or temperature change, and a automatic transmission including such stand-by hydraulic pressure value setting means.

SUMMARY OF THE INVENTION

According to an aspect of the present invention, a control apparatus of automatic transmission including plural friction engaging elements configures plural shift ranges based on combinations of each friction engaging element being in engaging or disengaging condition, a controlling unit for controlling the friction engaging elements to be in engaging or disengaging condition by controlling a hydraulic pressure applied thereto, comprising a switching means for switching the condition of the controlling unit to a learning mode for learning a stand-by hydraulic pressure value after a pre-charge; a means for determining a stand-by hydraulic pressure value activated upon the learning mode for determining the stand-by hydraulic pressure value based on input values indicating at least a turbine rotation number, wherein the means for determining a stand-by hydraulic pressure value, on condition that a vehicle is not traveling, and the controlling unit is switched to the leaning mode, includes a means for moving the friction engaging element toward engaging side by controlling the hydraulic pressure applied to the friction engaging element while the stand-by hydraulic pressure value is set to be gradually increased with predetermined time intervals by the controlling unit when an input shaft rotating number of the automatic transmission is constant; a means for measuring and memorizing the input values with predetermined intervals in a predetermined determining cycle; calculating and memorizing a current differential between a current input value within the predetermined determining cycle and another input value measured before the current input value within the predetermined determining cycle; and a means for learning and setting a current hydraulic pressure as the stand-by hydraulic pressure value when a change of the input value due to a decline of the turbine rotation number within the determining cycle fulfills a predetermined noise eliminating condition and the current differential in the determining cycle and a old differential in a former determining cycle exceed a predetermined threshold, further, it is confirmed that the turbine rotation number is decreased based on both differentials.

According to another aspect of the present invention, an automatic transmission further comprises an input means for detecting an engine rotation number, wherein the means for determining a stand-by hydraulic pressure value uses a rotation number differential between the turbine rotation number and the engine rotation number as the input value.

According to still another aspect of the present invention, a method for setting the stand-by hydraulic pressure value after a pre-charge for an automatic transmission including plural friction engaging elements configures plural shift ranges based on combinations of each friction engaging element being in engaging or disengaging condition, a controlling unit for controlling the friction engaging elements to be in engaging or disengaging condition by controlling a hydraulic pressure applied thereto, comprising a process for determining a stand-by hydraulic pressure value based on input values indicating at least a turbine rotation number, on condition that a vehicle is not traveling; a process for moving the friction engaging element toward engaging side by controlling the hydraulic pressure applied to the friction engaging element while the stand-by hydraulic pressure value is set to be gradually increased with predetermined time intervals by the controlling unit when an input shaft rotating number of the automatic transmission is constant; wherein the process for determining the pre-charge time includes: a process for measuring and memorizing the input values with predetermined intervals in a predetermined determining cycle; a process for calculating and memorizing a current differential between a current input value within the predetermined determining cycle and another input value measured before the current input value within the predetermined determining cycle, and a process for learning and setting a current hydraulic pressure as the stand-by hydraulic pressure value when a change of the input value due to a decline of the turbine rotation number within the determining cycle fulfills a predetermined noise eliminating condition and the current differential in the determining cycle and a old differential in a former determining cycle exceed a predetermined threshold, further, it is confirmed that the turbine rotation number is decreased based on both differentials.

According to still further aspect of the present invention, the process for determining the stand-by hydraulic pressure value uses a rotation number differential between the turbine rotation number and the engine rotation number as the input value.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
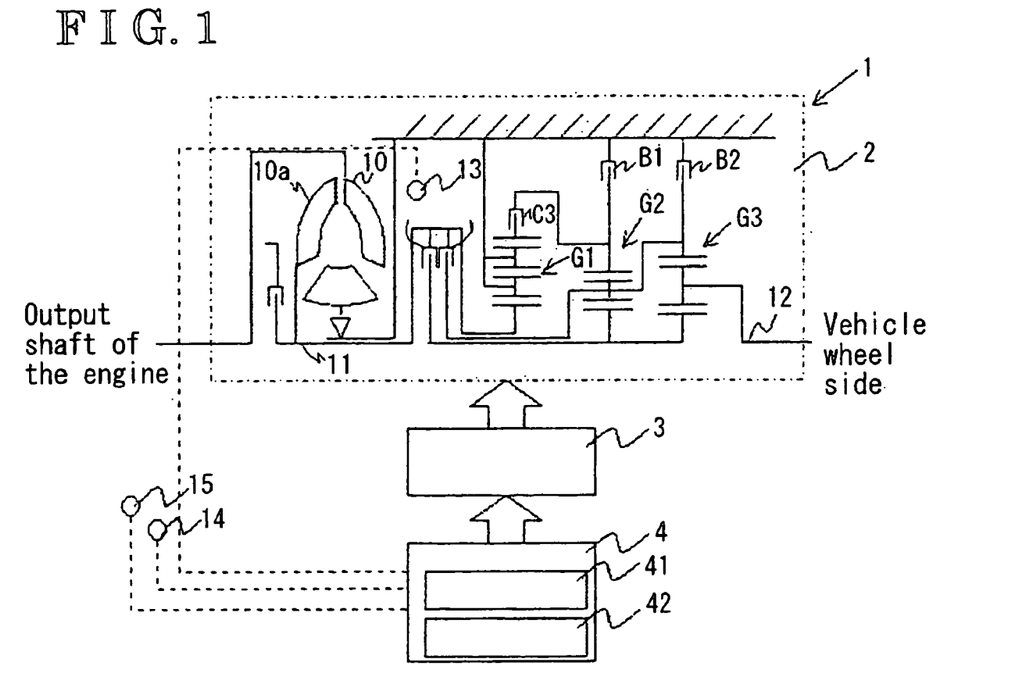
FIG. 1 illustrates a diagram showing a whole configuration of an automatic transmission in the embodiment according to the present invention.

A preferred embodiment of the present invention will be described hereinbelow in detail with reference to the accompanying drawings. FIG. 1 illustrates a whole configuration of an automatic transmission according to the embodiment of the present invention. According to FIG. 1, the automatic transmission 1 includes a transmission body 2, a hydraulic pressure controlling unit 3 and an electronic control unit 4.

Figure 2:
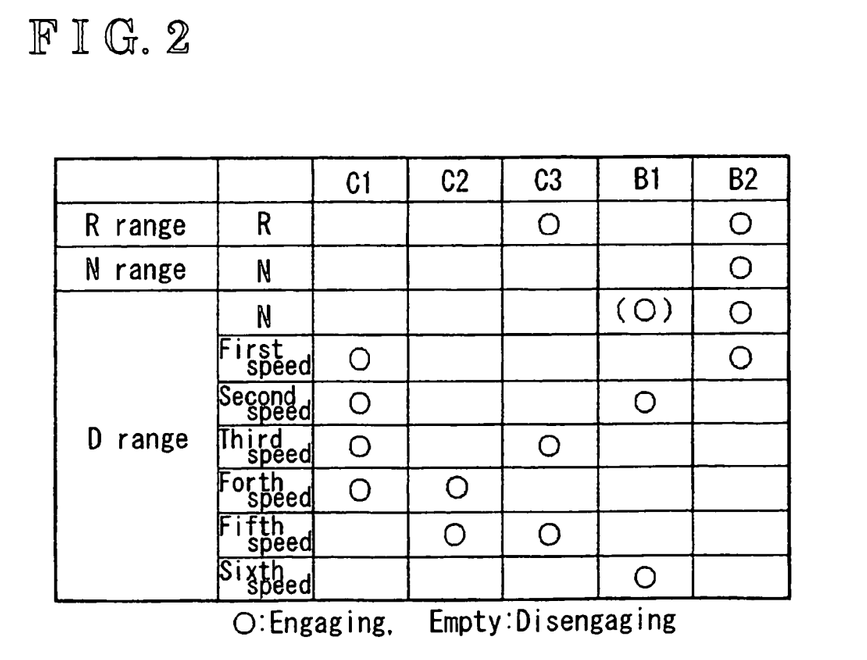
FIG. 2 illustrates a diagram showing engaging or disengaging conditions of the friction engaging elements relative to transmission shifts.

The transmission body 2 includes an input shaft 11 connected to a turbine 10a of a torque converter 10, an output shaft 12 connected to wheel side, a double pinion planetary gear G1 and single pinion planetary gears G2 and G3 connected to the input shaft 11, friction clutches C1, C2 and C3 provided between the input shaft 11 and the double pinion planetary gear G1, the single pinion planetary gears G2 and G3, and friction brakes B1 and B2. In aforementioned configuration, engaging or disengaging combination among the friction clutches C1, C2 and C3, and the friction brake B1 and B2 is selected by the hydraulic pressure control unit 3 and the electronic control unit 4. Thus, a certain shift range can be selected as shown in FIG. 2.

Figure 3:
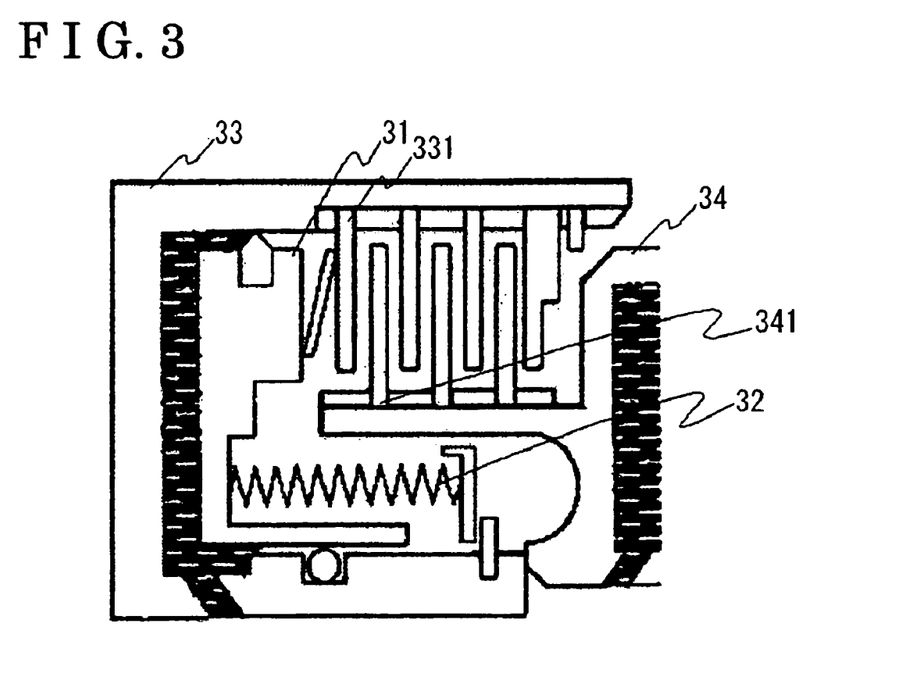
FIG. 3 illustrates a cross-sectional pattern diagram of a multi plate wet clutch as an example of the friction engaging elements.

FIG. 3 illustrates a pattern diagram of a multi plate wet clutch shown as an example of the friction engaging element. As shown in FIG. 3, each clutch includes a piston 31, a return spring 32 generating a reaction force against the piston 31, driven plates 331 fitted in a clutch drum 33 side, and drive plates 341 fitted in a clutch hub 34 side. Once the hydraulic control portion 3 increases the hydraulic pressure, the hydraulic control unit 3 increases the hydraulic pressure, the piston 31 is pressed against each plate side, and a friction is generated between each driven plate 331 and each drive plate 341, then the each driven plate 331 engages with the each drive plate 341 as a result, a turbine rotating number Nt is decreased. On the other hand, the hydraulic control unit 3 decreases the hydraulic pressure, the piston 31 is pushed back due to the reaction force of the return spring 32, then the each driven plate 331 disengages from the each drive plate 341.

Based on the instruction from the electronic control unit 4, the hydraulic control unit 3 switches an inner hydraulic circuit, selects an appropriate friction engaging element, controls the hydraulic pressure provided into the clutch, as a result, the friction engaging element becomes engaging or disengaging condition.

The electronic control unit 4 includes a computer for driving the hydraulic control unit 3 based on an input value from various sensors including a turbine rotating sensor 13 for detecting the turbine rotation number Nt of the input shaft 11 (turbine 10a), a position sensor 14 for detecting the position of the selector lever operated by a driver, and an engine rotation sensor 15 detecting an engine rotation number Ne. In addition, the electronic control unit 4 includes computer programs of a learning mode switching means 41 for switching the condition of the hydraulic control unit 3 to an operation mode for learning the stand-by hydraulic pressure value and a stand-by hydraulic pressure value determining means 42 for setting the stand-by hydraulic pressure value. Once a predetermined operation being detectable by the computer in the electronic control unit 4, the learning mode switching means 41 starts a setting process for an after-mentioned stand-by hydraulic pressure value.

A condition of a hydraulic pressure system represented by the multi plate wet clutch can be obtained by a formula (a) (fluid continuous formula) and a formula (b) (piston movement equation).

$$\frac{dPc}{dt} = \frac{K}{V}\left(Qs - Ap\frac{dx}{dt} - Qb\right) \quad (1)$$

$$m\frac{d^2x}{dt^2} + c\frac{dx}{dt} + k \times x + Fset = Ap \times Pc \quad (2)$$

Pc: engaging hydraulic pressure,
K: modulus of volume elasticity,
V: volumetric capacity,
Qs: incoming fluid flow,
Qb: leaking fluid flow,
Ap: piston area,
k×x+Fset: return spring force,
m: piston mass, and
C: attenuation coefficient Suppose the hydraulic pressure is increased in a staircase pattern by step pressures with a sufficient time interval. In such configuration, the fluid flow change can be ignored, the piston speed becomes slow and constant, and fluctuation can also be ignored. That is, the increasing condition of the hydraulic pressure seems to be almost static.

In case step pressure is very small amount and step interval is adequately long, the first and second terms on the left side of the formula (2) can be ignored, and the formula (2) can be simplified as follows.

$$Pc = \frac{k \times x + Fset}{Ap} \quad (3)$$

The piston is moved toward engaging side, and an indicated pressure when an end of an area in which the piston stroke is controlled by the amount of the oil is detected can be adopted as the stand-by hydraulic pressure (a return spring equivalent pressure Pc).

A method for setting the stand-by hydraulic pressure value relative to the friction clutch C3 will be explained. Firstly, the condition of the vehicle is set as follows. The vehicle is not traveling (the output shaft 12 is fixed) while the engine starts, and the aforementioned program for setting the stand-by hydraulic pressure starts. Then, the select lever is shifted from N range (the friction brake B2 is engaging) to R range (the friction clutch C3 engages with the friction brake B2). In this condition, the electronic control unit 4 controls the friction brake B2 to be in engaging condition through the hydraulic pressure control unit 3. As aforementioned above, the N range is a neutral condition in which the friction brake B2 is in engaging condition, so that the electronic control unit 4 maintains such neutral condition.

Then, the electronic control unit 4 outputs a driving signal through the hydraulic control portion 3 for progressively increasing the hydraulic pressure applied to the friction clutch C3 at the step pressure ⊿P (e.g. 10 Kpa) with time interval ⊿t (e.g. 0.9 sec).

Figure 4:
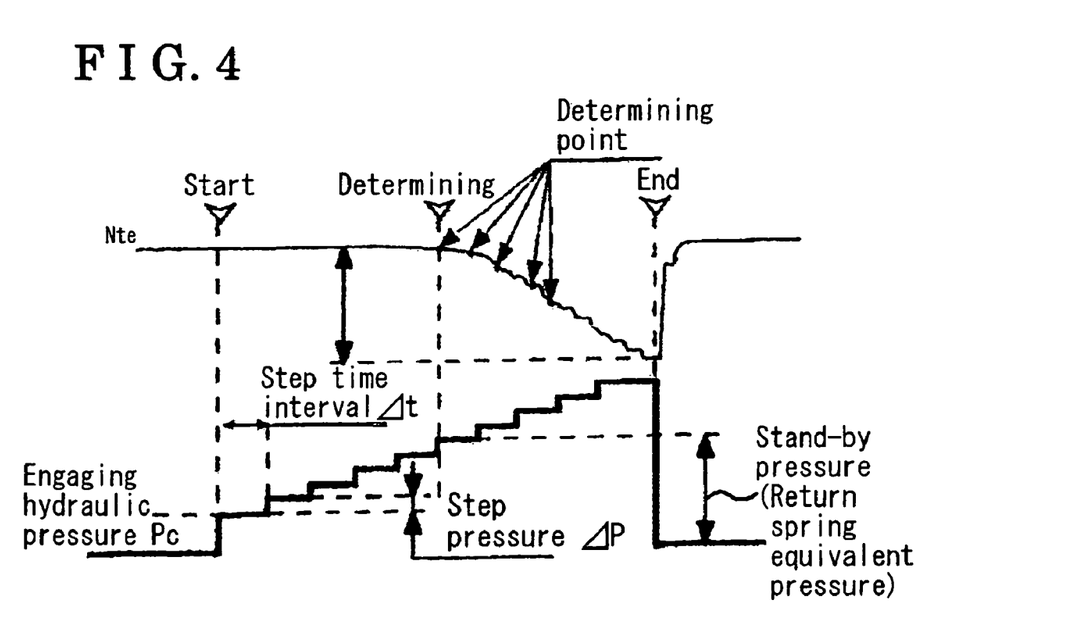
FIG. 4 illustrates a graph indicating a change of the turbine rotation number Nt and a hydraulic pressure wave form used in the present invention.

FIG. 4 illustrates a graph showing a stepped hydraulic pressure waveform obtained by the aforementioned control and the turbine rotation number Nt. As shown in FIG. 4, the electronic control unit 4 executes the aforementioned driving control, at the same time, the electronic control unit 4 monitors a difference value ⊿Nte between the turbine rotation number Nt and the engine rotation number Ne per measuring cycle being certainly shorter than the time interval ⊿t, for example, 100 msec interval. Then the electronic control unit 4 detects whether or not the piston exceeds the range being controlled based on the amount of the oil (piston end), and the engaging hydraulic pressure Pc at the piston end is determined as the stand-by hydraulic pressure value of the friction clutch C3.

Figure 5:
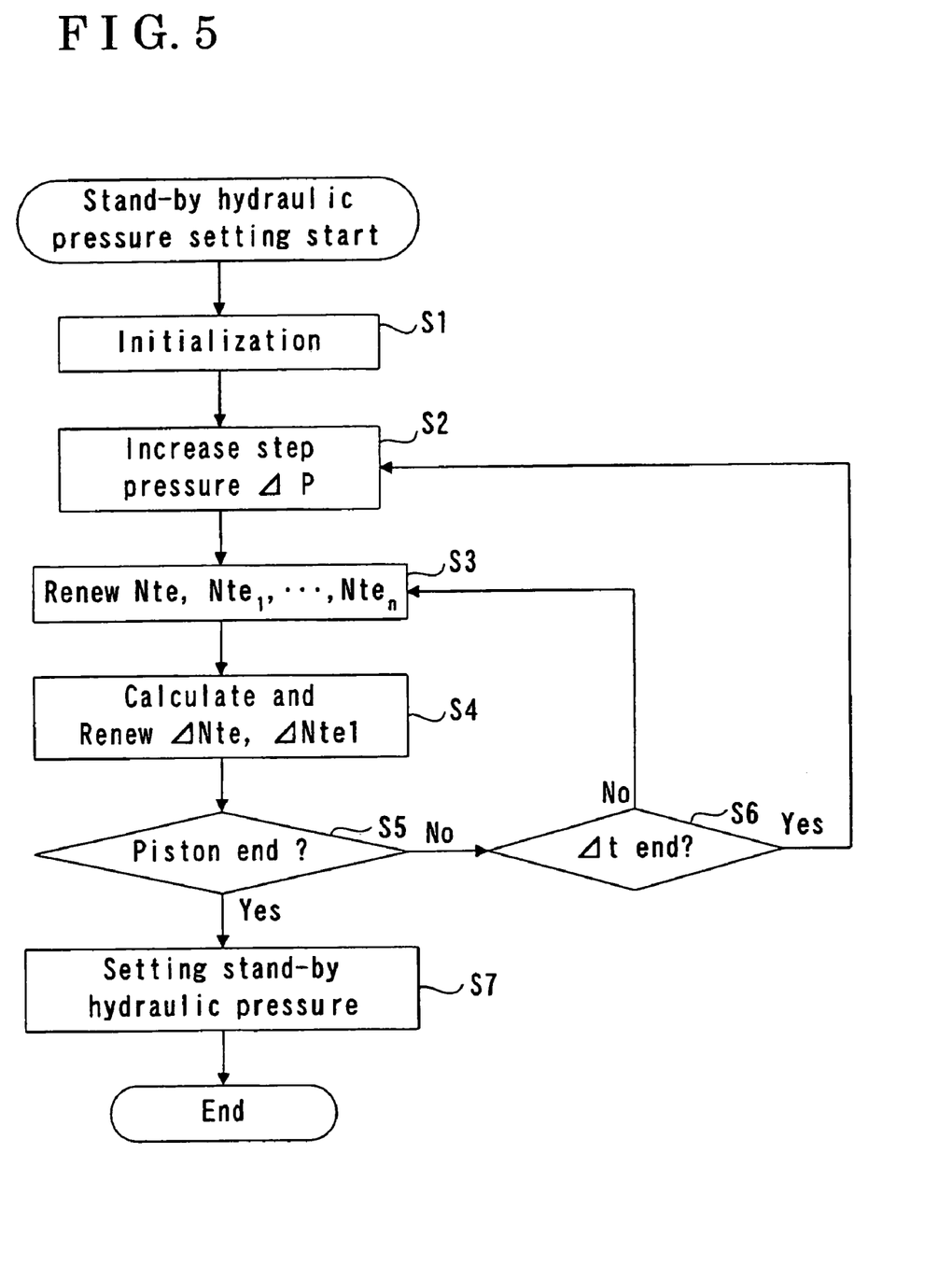
FIG. 5 illustrates a flow chart of a setting process of a stand-by hydraulic pressure value according to the embodiment of the present invention.

The aforementioned determining process will be explained in detail in reference to FIG. 5. The electronic control unit 4 executes a predetermined initializing process (Step S1), increases the engaging hydraulic pressure at the step pressure ⊿P (Step S2), replaces Nte, Nte$_1$, . . . Nte$_{n-1}$, of a former cycle with Nte$_1$, Nte$_2$ . . . Nte$_n$ and memorizes an input value Nte of a current cycle (Step S3). Then, the electronic control unit 4 replaces ⊿Nte, with the former different value ⊿Nte and memorizes a ⊿Nte$_1$. At the same time, the electronic control unit 4 calculates a difference between the input value Nte of the current cycle and the input vale Nte$_n$ of a predetermined cycle before (e.g. 500 msec before), and memorizes the difference as the difference value ⊿Nte (Step S4). Finally, each obtained value is compared as follows.

(A) ⊿Nte>threshold Nte_th (e.g. 10 rpm)

(B) ⊿Nte$_1$>threshold Nte_th (e.g. 10 rpm)

(C) ⊿Nte>⊿Nte$_1$ (D) Nte is continuously increasing or being same more than or equal to a predetermined m times. (e.g. m=5)

(Nte>=Nte$_1$>=Nte$_2$>= . . . Nte$_m$)

If the aforementioned conditions are all true (all A through D), it is confirmed that the piston exceeds the range being controlled based on the amount of the oil (Step S5). The aforementioned condition (D) is for preventing misjudge due to noise and the like. Through the determining process, if it is confirmed that the piston exceeds the range being controlled based on the amount of the oil (piston end), the engaging hydraulic pressure at the time when the piston end is established is learned as the stand-by hydraulic pressure value (Step S7).

On the other hand, if it is not confirmed that the piston exceeds the range being controlled based on the amount of the oil (piston end), the process from Step S3 to Step S5 is repeated within the time interval ⊿t. If the time interval ⊿t ends, the process goes back to Step S2 and increases the engaging hydraulic pressure at the step pressure a ⊿p (Step S6).

Figure 6:
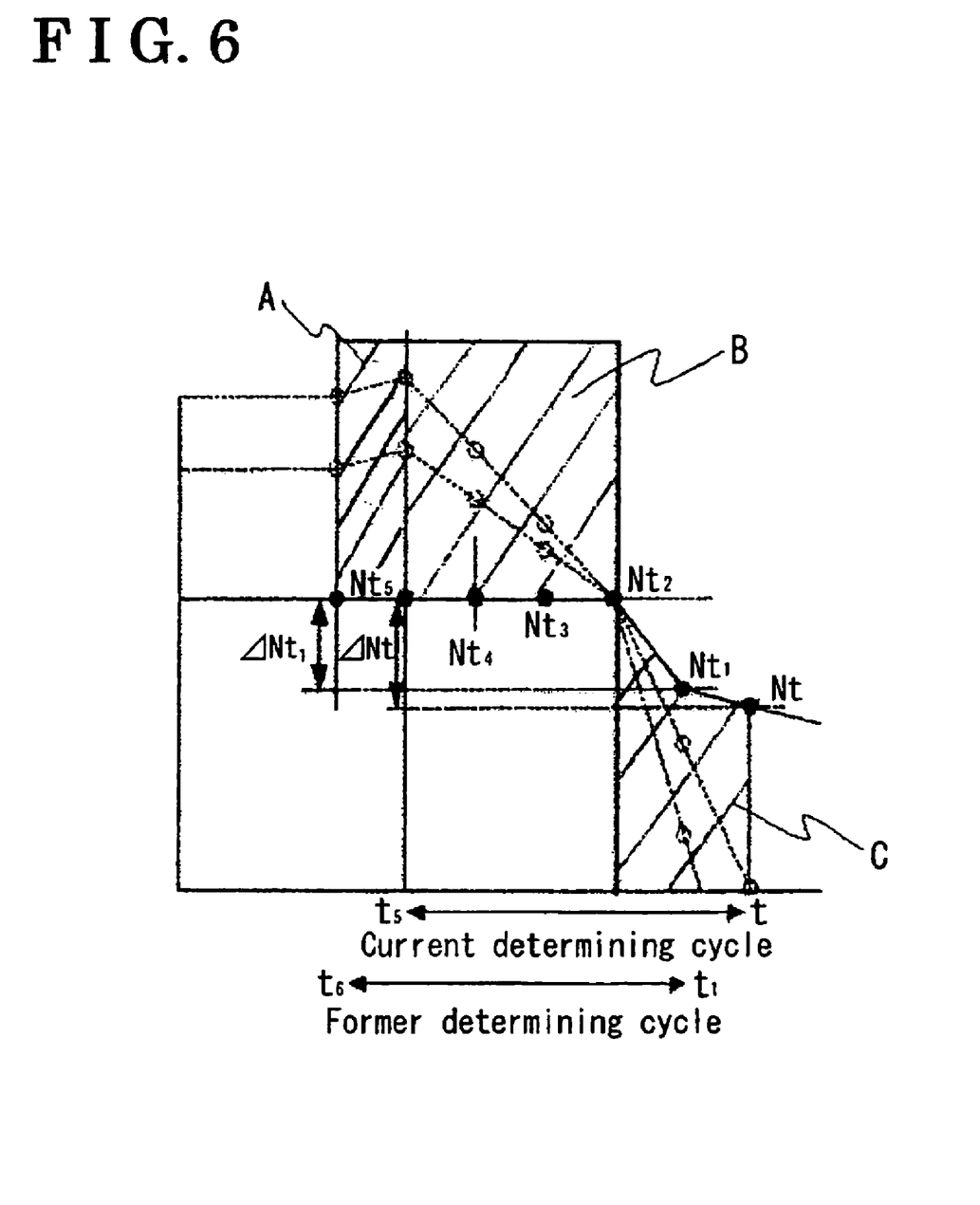
FIG. 6 illustrates an explanation diagram of an example of determining conditions, which indicating a change of the turbine rotation number near a point at which a piston end is determined.

FIG. 6 illustrates a graph indicating decreasing condition of the turbine rotating number Nt near the point where the piston end is determined. In the aforementioned conditions, the engine rotation number Ne is referred, however, the engine rotation number Ne is not shown in the graph because the engine rotation number Ne is approximately constant. As shown in FIG. 6, a solid line connecting small black circles (Nt, Nt$_1$, Nt$_2$ . . . Nt$_n$) is a line connecting plural determining limit points for detecting a sharp decline of the turbine rotation number Nt which indicates that the piston exceeds the range being controlled based on the amount of the oil (piston end). In other word, when the turbine rotation number Nt continuously declines in a shaded area B and a shaded area C, the aforementioned all condition (A) through (D) are all true. That is, it is determined that the piston exceeds the range being controlled based on the amount of the oil (piston end). Such configuration can be applied even if the turbine rotation number Nt is increased in a shaded area A.

The obtained stand-by hydraulic pressure value (return spring equivalent pressure) in this way precisely corresponds to a value obtained from the formula (3) by setting the piston stroke and dividing the return spring force obtained by measuring their own force by the piston area. In this say, the stand-by hydraulic pressure value (return spring equivalent pressure value) being corresponding to the each automatic transmission and eliminating the fluctuation of the vehicle can be obtained precisely, and such value is applicable to the stand-by hydraulic pressure value after pre-charge.

In addition, the misjudge or fluctuations can be reduced by regulating the step pressure ⊿P by the electronic control unit 4. When the inclination pitch of the actual pressure is smaller than the inclination pitch of the indicated pressure, the rotation change is supposed to be reduced. In this case, the rotation change is increased by slightly increasing the step pressure ⊿P.

Figure 7:
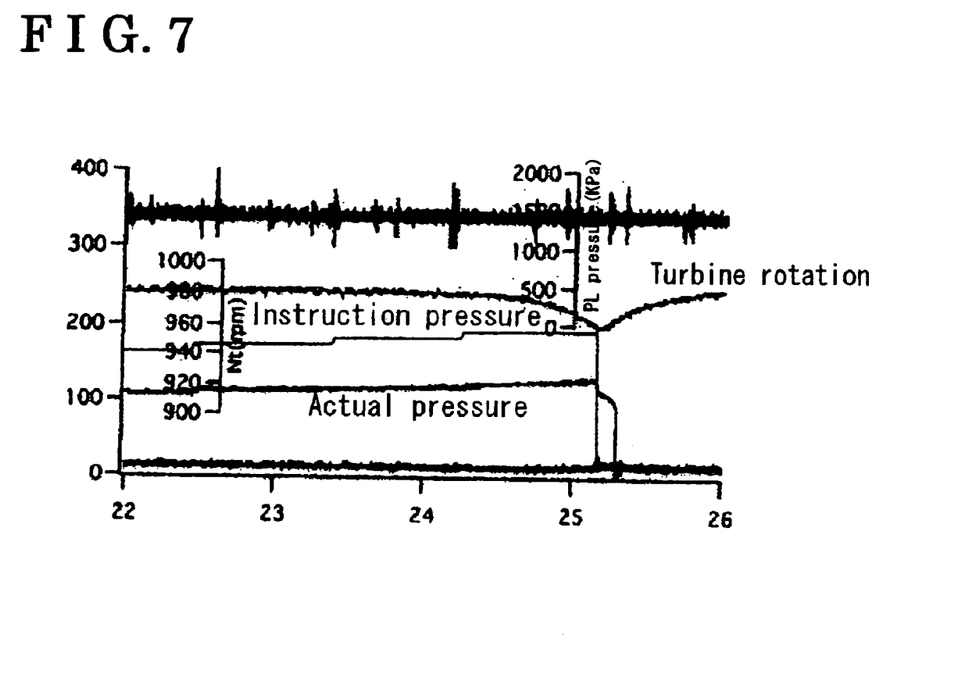
FIG. 7 illustrates a graph indicating an actual pressure and the turbine rotation change when the hydraulic pressure is increased in a staircase pattern.

In the embodiment of the present invention, the input value Nte is calculated from the formula |Nt−Ne|=Nte considering the change of the engine rotation. The reason of such configuration will be explained as follows. FIG. 7 illustrates a graph showing the actual pressure increased in a staircase pattern and the turbine rotation change on a friction engaging element having small rotation change. As shown in FIG. 7, the hydraulic pressure is increased in a stepped hydraulic pressure waveform, so that the turbine rotation changes very slowly. In the embodiment of the current invention, the turbine rotation change is obtained in reference to the engine rotation change, so that the turbine rotation change can be obtained even if the friction engaging element shows a little rotation change. In addition this configuration can be also applied to a vehicle including an engine having large engine rotation change.

In the embodiment of the present invention, the determining cycle is set to 100 msec, and the threshold is set to 10 rpm as a one of the preferable embodiment of the present invention, however, these predetermined values may be changed. In addition, the turbine rotation number Nt itself can be used upon a motor bench test instead of the formula |Nt−Ne|=Nte. In this case, the inequality sign in each condition (A) through (D) will be reversed, and the threshold value will be a minus number.

According to the present invention, the individual difference between each vehicle can be absorbed, and an accurate stand-by hydraulic pressure can be set. In addition, the present invention is rarely affected by various conditions, such as the vehicle, the automatic transmission, temperature and the like. Furthermore, it is proved that the automatic transmission according to the present invention is rarely affected by the hydraulic pressure vibration based on a test on vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. A control apparatus of automatic transmission including plural friction engaging elements configures plural shift ranges based on combinations of each friction engaging element being in engaging or disengaging condition and a controlling unit for controlling the friction engaging elements to be in engaging or disengaging condition by controlling a hydraulic pressure applied thereto, comprising:

a switching means for switching the condition of the controlling unit to a learning mode for learning a stand-by hydraulic pressure value after a pre-charge;

a means for determining a stand-by hydraulic pressure value activated upon the learning mode for determining the stand-by hydraulic pressure value based on input values indicating at least a turbine rotation number, wherein the means for determining a stand-by hydraulic pressure value, on condition that a vehicle is not traveling, and the controlling unit is switched to the leaning mode, includes:

a means for moving the friction engaging element toward engaging side by controlling the hydraulic pressure applied to the friction engaging element while the stand-by hydraulic pressure value is set to be gradually increased with predetermined time intervals by the controlling unit when an input shaft rotating number of the automatic transmission is constant;

a means for measuring and memorizing the input values with predetermined intervals in a predetermined determining cycle;

a means for calculating and memorizing a current differential between a current input value within the predetermined determining cycle and another input value measured before the current input value within the predetermined determining cycle; and a means for learning and setting a current hydraulic pressure as the stand-by hydraulic pressure value when a change of the input value due to a decline of the turbine rotation number within the determining cycle fulfills a predetermined noise eliminating condition and the current differential in the determining cycle and a old differential in a former determining cycle exceed a predetermined threshold, further, it is confirmed that the turbine rotation number is decreased based on both differentials.

2. A control apparatus of automatic transmission according to claim 1 further comprising an input means for detecting an engine rotation number, wherein the means for determining a stand-by hydraulic pressure value uses a rotation number differential between the turbine rotation number and the engine rotation number as the input value.

3. A method for setting the stand-by hydraulic pressure value after a pre-charge for an automatic transmission including plural friction engaging elements configures plural shift ranges based on combinations of each friction engaging element being in engaging or disengaging condition, a controlling unit for controlling the friction engaging elements to be in engaging or disengaging condition by controlling a hydraulic pressure applied thereto, comprising:

determining a stand-by hydraulic pressure value based on input values indicating at least a turbine rotation number, on condition that a vehicle is not traveling;

moving the friction engaging element toward engaging side by controlling the hydraulic pressure applied to the friction engaging element while the stand-by hydraulic pressure value is set to be gradually increased with predetermined time intervals by the controlling unit when an input shaft rotating number of the automatic transmission is constant;

wherein determining the pre-charge time includes:

measuring and memorizing the input values with predetermined intervals in a predetermined determining cycle;

calculating and memorizing a current differential between a current input value within the predetermined determining cycle and another input value measured before the current input value within the predetermined determining cycle; and learning and setting a current hydraulic pressure as the stand-by hydraulic pressure value when a change of the input value due to a decline of the turbine rotation number within the determining cycle fulfills a predetermined noise eliminating condition and the current differential in the determining cycle and a old differential in a former determining cycle exceed a predetermined threshold, further, it is confirmed that the turbine rotation number is decreased based on both differentials.

4. A method for setting a stand-by hydraulic pressure value according to claim 3, wherein determining a stand-by hydraulic pressure value uses a rotation number differential between the turbine rotation number and the engine rotation number as the input value.

* * * * *